Figure 1:
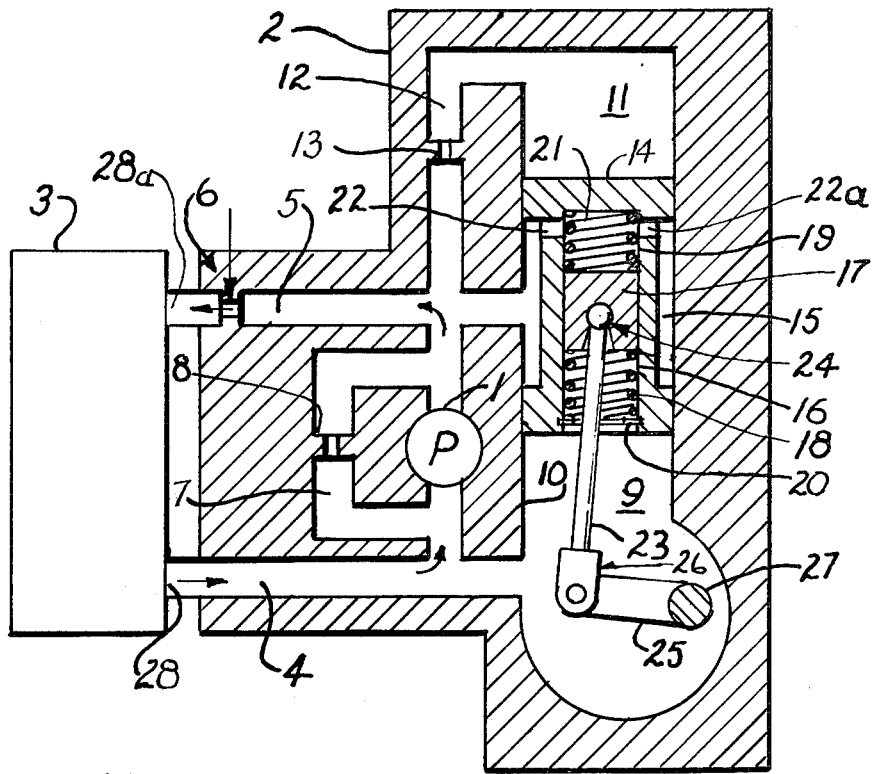

United States Patent [19]
Gold

[11] 4,218,884
[45] Aug. 26, 1980

[54] HYDRAULIC SPEED GOVERNOR

[76] Inventor: Harold Gold, 3645 Tolland Rd., Shaker Heights, Ohio 44122

[21] Appl. No.: 958,787

[22] Filed: Nov. 8, 1978

Related U.S. Application Data

[62] Division of Ser. No. 525,687, Feb. 7, 1966, Pat. No. 3,523,742.

[51] Int. Cl.² .............................................. F15B 15/18
[52] U.S. Cl. ........................................ 60/431; 60/449; 60/494; 91/436; 137/106; 137/596
[58] Field of Search ............ 137/106, 115, 596, 596.12, 137/596.13; 60/423, 431, 449, 468, 494; 417/1; 91/436

[56] References Cited

U.S. PATENT DOCUMENTS

| | | | |
|---|---|---|---|
| 2,448,557 | 9/1948 | Stephens | 137/596.13 |
| 2,477,669 | 8/1949 | Stephens | 91/436 X |
| 2,733,688 | 2/1956 | Badenoch | 91/446 X |
| 2,944,527 | 7/1960 | Vander Kaar | 137/596.1 X |
| 3,133,559 | 5/1964 | Tennis | 137/625.69 X |
| 3,523,742 | 8/1970 | Gold | 137/596.1 X |
| 4,121,609 | 10/1978 | Gold | 137/115 |

*Primary Examiner*—Edgar W. Geoghegan

[57] ABSTRACT

Flow from a pressure source is bidirectionally conducted to a prime-mover driven, bidirectional, positive displacement pump and in-series flow restrictions; the pressure source and flow restrictions functioning to provide the reference flow rate; the pressure gradient across said pump bidirectionally signaling the error in prime-mover speed. Means responsive to said pressure gradient provide proportional plus integral control of the prime-mover speed.

8 Claims, 9 Drawing Figures

HYDRAULIC SPEED GOVERNOR

This application is a division of Ser. No. 525,687, Feb. 7, 1966, now U.S. Pat. No. 3,523,742.

This invention relates to a hydraulic speed governor for the regulation of the speed of motors, engines and other prime movers. The invention employs the deviation from zero of the pressure gradient across a positive displacement pump, that is driven at a fixed ratio to the speed of the prime mover and that is fed with a reference flow rate, to activate corrective movement of the prime mover throttle.

It is a prime object of the invention to utilize variable flow restriction means in conjunction with an in-series pressure generator for control of the reference flow rate and thereby, to permit variation of the reference flow rate by simple and low power requiring means.

It is a further object of the invention to provide an actuator means through which governors of the type described can provide proportional plus integral response to speed deviation.

It is still another object of the invention to provide a speed governor in which control parameters can be varied through variation of the flow resistance of simple flow restrictions.

It is yet another object of the invention to provide a reference flow control means that enables the actuator means to attain very high levels of output force with a minimum of speed deviation.

It is an additional object of the invention to adapt a four-way valve for direct hydraulic connection to the speed-deviation detecting pump, and therewith, to obtain proportional plus integral response of valve area to speed deviation.

Figure 2:
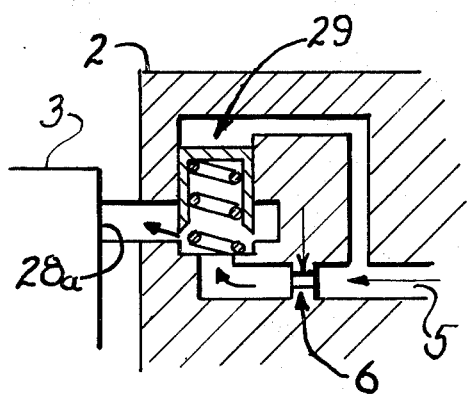
Figure 3:
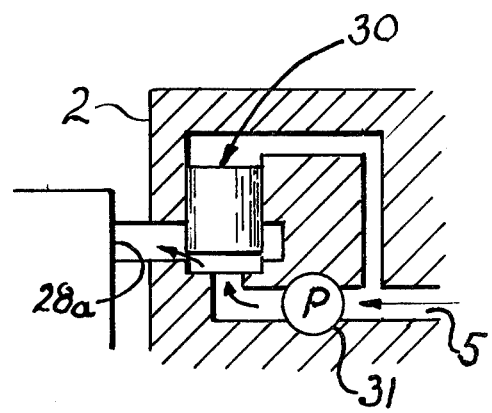
Figure 4:
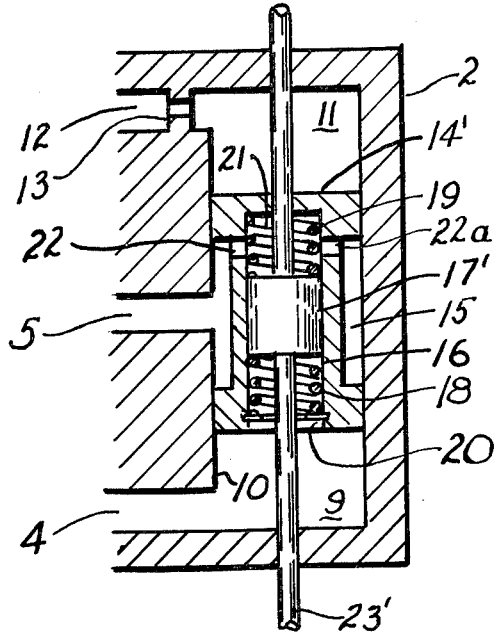
Figure 5:
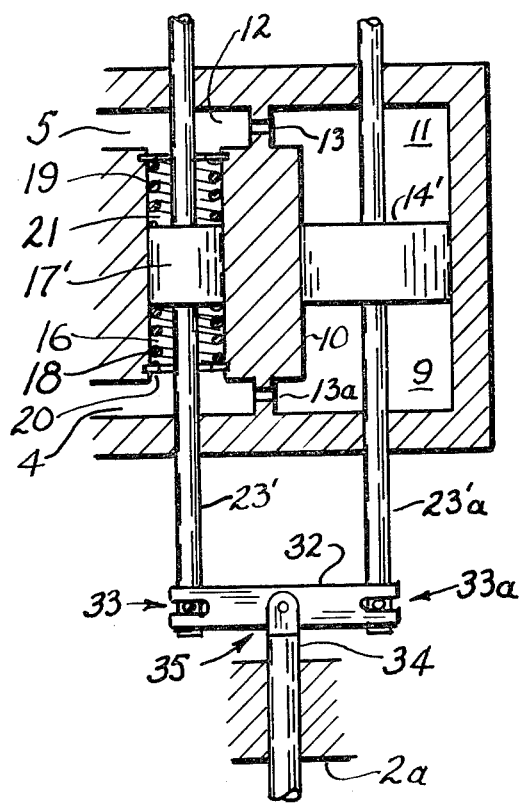
Figure 6:
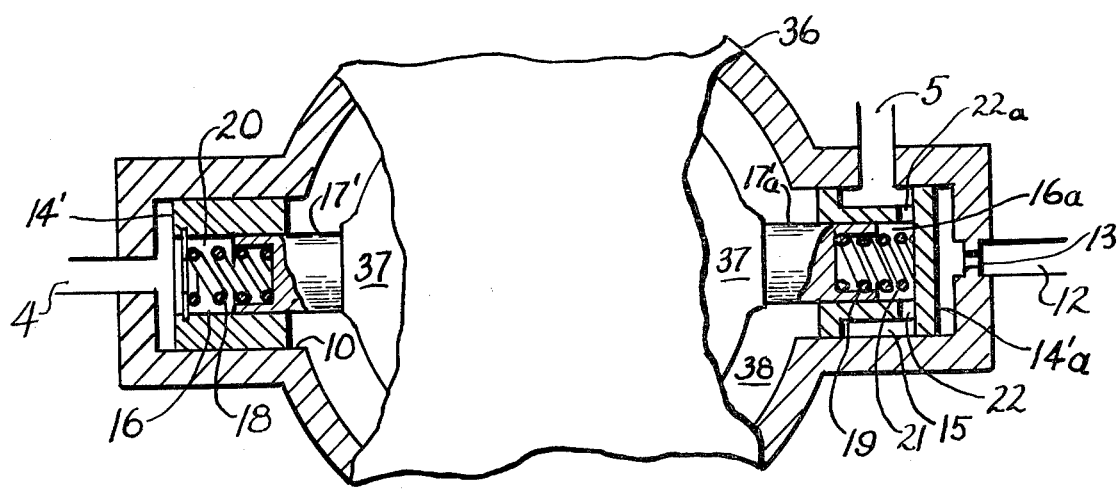
Figure 7:
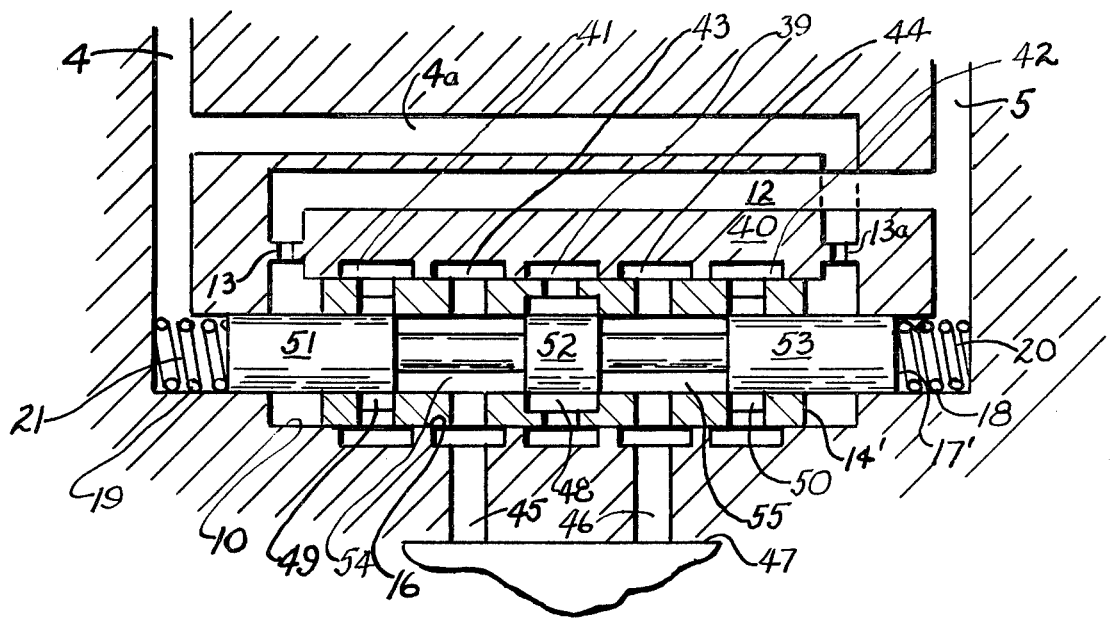
Figures 8, 9:
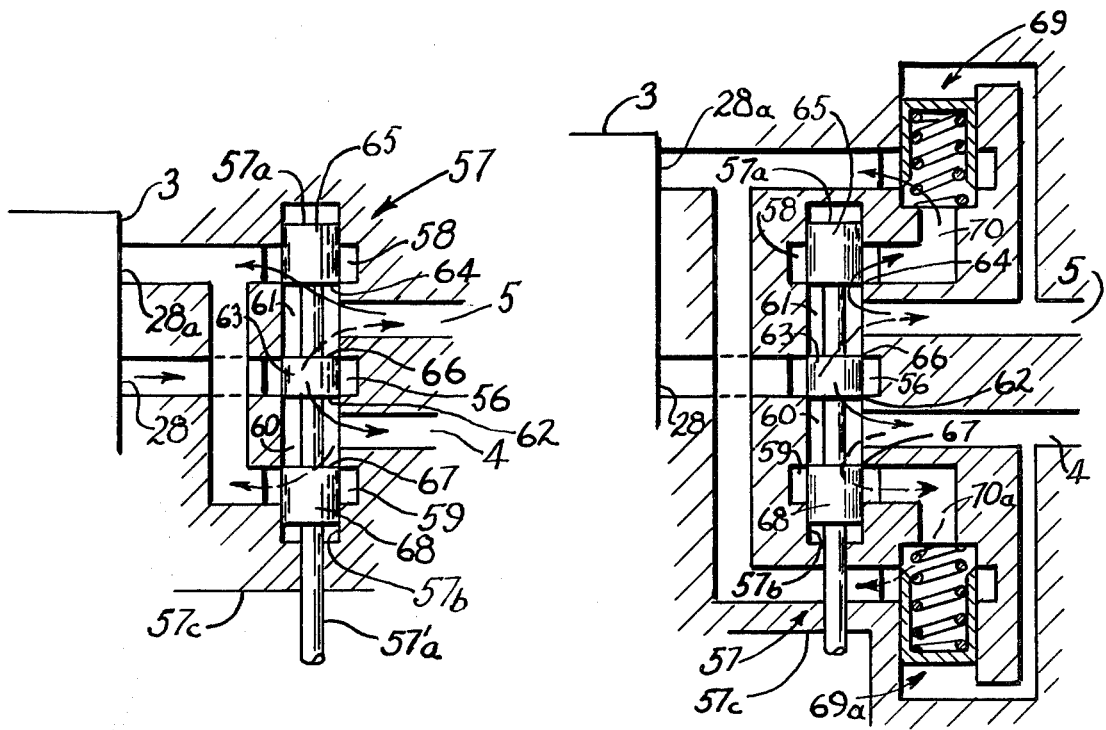

Other important objects, features and advantages of the invention will be more fully apparent from the following detailed description taken in conjunction with the accompanying drawings in which:

FIG. 1 is a schematic drawing of the hydraulic speed governor illustrating the basic hydraulic circuit and mechanism of the invention and a preferred form of the throttle actuator; and FIG. 2 is a schematic drawing illustrating the addition of an element to the reference flow rate controlling restriction to obtain high actuator output forces; and FIG. 3 is a schematic drawing that shows a second type of reference flow rate controlling restriction that provides both high actuator output forces and a means for obtaining the synchronization of the speed of the prime mover being governed with a reference speed; and FIG. 4 is a schematic drawing illustrating a modification to the actuator shown in FIG. 1 to obtain linear output; and FIG. 5 is a schematic drawing illustrating an alternate actuator form for obtaining linear output; and FIG. 6 is a schematic drawing illustrating a form of the throttle actuator that is preferred in the application of the invention to a class of prime movers typified by the variable displacement hydraulic motor; and FIG. 7 is a schematic drawing illustrating an adaptation of a four-way spool valve that permits direct hydraulic connection to the speed-deviation detecting pump; and FIG. 8 is a schematic drawing illustrating the installation of a four-way valve in the circuit of the invention to serve as a bidirectional reference flow rate controlling restriction; and FIG. 9 is a schematic drawing illustrating the addition of elements to the four-way valve to obtain high actuator forces through the method of the invention.

In the description, and with reference to the drawings, the structure and operation of the invention will be divided under headings for ease of explanation.

BASIC ARRANGEMENT

Referring to FIG. 1, positive displacement pump 1 is housed in control body 2 and is coupled to the prime mover, not shown, being governed, whereby pump 1 produces a rate of displacement that is proportional to the speed of the prime mover. Pump 1 communicates with hydraulic-pressure generator 3 by means of passages 4 and 5. Variable restriction 6 is located in passage 5. Passage 7 bypasses pump 1 and contains flow restrictions 8. Chamber 9, at one end of cylindrical bore 10, communicates freely with passage 4. Chamber 11, at the opposite end of bore 10, communicates with passage 5 through passage 12. Passage 12 contains flow restriction 13. Piston 14 mates with and slides freely in bore 10. Annular chamber 15, which is formed in the outer wall of piston 14, communicates freely with passage 5. Cylindrical bore 16, formed coaxially in piston 14, houses freely sliding piston 17. Springs 18 and 19 are retained in bore 16 and coact to urge piston 17 toward substantially mid-stroke in bore 16. Chamber 20 of bore 16 communicates freely with passage 4 through chamber 9. Chamber 21 of bore 16 communicates freely with passage 5 through passages 22 and 22a and through chamber 15. Rod 23 is coupled to piston 17 by means of ball and socket joint 24 and is coupled at its opposite end to crank 25 by pin and clevis 26. Crank 25 is fastened to shaft 27. Through means not shown, shaft 27 is journaled in housing 2 in suitable low friction bearings and extends through the walls of housing 2 through a suitable seal, following which shaft 27 is coupled by suitable linkage to the throttle of the prime mover being governed. As used in the specification and in the claims the term 'throttle' refers to any means through which the rate of flow of energy into a prime mover may be modulated for the purpose of speed control.

Pressure generator 3 may comprise any suitable combination of reservoir, pump and pressure-control means, whereby a substantially constant pressure gradient is maintained between the discharge port 28 and the return port 28a. As will be explained, the control system of this invention functions in the same manner with flow from the pressure generator in either direction. For this reason the functions of ports 28 and 28a may be interchanged, it being understood that in the case of either direction of flow, the flow direction, the driven direction of pump 1 and the direction of throttle movement through rotation of shaft 27 are so constituted that a stable closed loop control system is established.

In FIG. 1 restriction 6 is indicated as being mechanically variable in flow area and restrictions 8 and 13 are shown as being fixed. This arrangement has been selected for the initial component identification because it represents the basic system wherein restriction 6 is made variable in order to provide a simple means for selection of the governed speed of the prime mover. As the description of the method of operation of the system proceeds it will be apparent that provision in the mechanical design of the control system to permit adjustment, by mechanical means or by replacement, of restrictions 8 and 13 is useful for matching the response of the control system to the prime mover.

STEADY-STATE OPERATION

In steady state, the speed of the prime mover is constant with the throttle fixed and consequently, pistons 14 and 17 are at rest. If there is no external torque acting on shaft 27, the pressure gradients across pistons 14 and 17 are zero and therefore, the pressures in chambers 9, 11, 20 and 21 are equal. By virtue of the communicating passages, the pressures in passages 4 and 5 are also equal and the pressure gradient across pump 1 and restriction 8 is zero. It then follows that the flow through restriction 8 is zero and that the flow induced by the pressure gradient between ports 28 and 28a passes unrestricted and unaided through rotating pump 1, thereby making the pressure gradient across restriction 6 equal to the pressure gradient between ports 28 and 28a. Therefore, in steady state pump 1 is driven by the prime mover at a speed that produces a rate of displacement that equals the rate of flow through variable restriction 6. The steady-state speed is therefore determined by the effective open area of variable restriction 6 and the pressure gradient between ports 28 and 28a, or correspondingly, the reference flow rate. The pressure gradient can be held precisely constant by known methods of pressure regulation, permitting the reference flow rate, and therefore the steady-state speed, to remain precisely constant at a fixed setting of variable restriction 6; correspondingly, adjustment of the open area of restriction 6 changes the governed speed of the prime mover.

The conditions for steady-state operation, described above, hold identically for flow in the direction opposite to that indicated by the arrows in FIG. 1. Furthermore, these conditions also fully hold for location of restriction 6 at either the discharge port or the return port of the pressure generator, or for flow restrictions at both ports. If restrictions are installed at both ports of pressure generator 3, the flow resistances of the two restrictions are summed in the hydraulic circuit and hence may be replaced by a single resistance that is equal to the sum. The location of the single restriction 6, shown in FIG. 1 at the return port, is the preferred location when one restriction is employed because a high static pressure is maintained in the hydraulic circuit of the invention.

TRANSIENT OPERATION

Upon the occurrence of a deviation of the speed of the prime mover from the steady-state speed, previously defined, the equality of flow rate through variable restriction 6 and the rate of displacement of pump 1 is destroyed and a pressure gradient between passages 4 and 5 appears. This pressure gradient sets pistons 14 and 17 into motion, through which a corrective adjustment of the prime mover throttle is made and the steady-state speed is restored. The transient operation of the governor of this invention is restoring the steady-state speed will be described in the following paragraphs.

The transient flow-rate equilibrium which exists during the period of the speed deviation is made up of the following components: the flow rate through restriction 8; the deviation of the flow rate through restriction 6, from the steady-state flow rate; the flow rate through restriction 13; and the flow rates into and out of chambers 9, 11, 20, and 21, which accompany the motion of pistons 14 and 17. If there is no external torque acting on shaft 27, the motion of piston 14 is essentially force free and therefore, no pressure gradient appears across piston 14. For this reason, the pressure gradients across restrictions 8 and 13 are equal through out the period of a speed deviation. The pressure gradient between passages 4 and 5 appears as a perturbation on the steady state pressure gradient across restriction 6. In view of these considerations, restrictions 6, 8 and 13 act as parallel flow resistances during the period of the speed deviation. The flow rate throgh this parallel network is zero in steady state and is proportional to the speed deviation during the period of the deviation. It then follows that the pressure gradient between passages 4 and 5 is proportional to the product of the speed deviation and the parallel resistance of restrictions 6, 8 and 13. To the extent that this flow resistance remains constant during the period of the speed deviation, the pressure gradient between passages 4 and 5 varies linearly with speed deviation. In the configuration illustrated in FIG. 1, which utilizes a single reference-flow controlling restriction 6, located at the return port of the pressure generator 3, the pressure in passage 4 is at all times held constant by pressure generator 3. In this instance the pressure gradient between passages 4 and 5 is equal to the rise or fall of the pressure in passage 5. In the configuration presented in FIG. 1, a positive speed deviation causes an increase in pressure in passage 5 and a negative speed deviation causes a decrease.

In the event of a sudden drop in prime mover speed or a sudden increase in the open area of restriction 6, the accompanying sudden decrease in pressure in passage 5 is transmitted immediately to chambers 11 and 21. Because the flow path from passage 5 to chamber 21 is of insignificant flow resistance, piston 17 moves very rapidly toward chamber 21 against the centering forces of springs 18 and 19, and draws crank 25 through an angular increment that is proportional to the decrease in pressure in passage 5 and is hence proportional to the speed deviation. Simultaneously with the displacement of piston 17, piston 14 moves toward chamber 11 at a rate that is proportional to the rate of flow through restriction 13. As described above, the pressure gradient across restriction 13 is proportional to the speed deviation. Therefore, the velocity of piston 14 is proportional to the speed deviation and its displacement is proportional to the time integral of the speed deviation. The displacement of joint 24 relative to shaft 27 is the sum of the displacement of piston 17 in bore 16 and the displacement of piston 14 relative to shaft 27. Therefore, the angular displacement of crank 25 following a sudden speed deviation is proportional to the sum of a displacement that is proportional to the speed deviation and a displacement that is proportional to the time integral of the speed deviation.

In the event of a sudden increase in prime mover speed or a sudden increase in the open area of restriction 6, the pressure in passage 5 abruptly increases. The resulting action is identical with that described in the previous paragraph, with the exception that the piston and crank motions occur in the opposite direction.

In the description of the transient response given in the previous paragraphs, the flow resistances of restrictions 6, 8 and 13 have been considered as constant, flow resistance being herein defined as the derivative of pressure drop with respect to flow rate. Constant flow resistance, as obtainable with laminar flow restriction yields linear transient response as described. If restrictions 6, 8 and 13 have square-law pressure-flow characteristics, as in the case of orifices, the derivative of pressure drop across the restriction with respect to flow rate is not constant but is proportional to flow rate and therefore the flow resistance is proportional to flow rate. This effect produces non-linearities in the transient response of the system, but, as will be described in the following section, the proportional plus integral character of the response of the system and the steady-state operation are unchanged. The response of the system is not significantly modified for small magnitude speed deviations and the steady-state operation is unchanged. Therefore, restrictions 6, 8 and 13 may be of either the laminar flow or orifice type. If laminar restrictions are employed, mechanical adjustment of their flow resistance can be obtained through the use of known variable-length, annular clearance or capillary devices.

MODIFICATION OF THE TRANSIENT RESPONSE

The rate of change of pressure gradient between passages 4 and 5 with speed deviation increases with the flow resistances of restrictions 6,8 and 13. Variation of the flow resistance of restriction 8 does not affect the rate of integration of the speed deviation or the steady-state speed. For these reasons, variation of the resistance of restriction 8 provides a suitable method for loop-gain adjustment. Removal of restriction 8 from passage 7 reduces the loop gain to zero and closing off passage 7 brings about the maximum loop gain achievable without an increase in the ratio of rate of displacement of pump 1 to prime-mover speed.

The velocity of piston 14 that results from a pressure gradient between passages 4 and 5 is adjustable through variation of the flow resistance of restriction 13. In the limit, the closing off of restriction 13 locks piston 14 and thereby causes the displacement of crank 25 to be responsive to piston 17 only, in which case the displacement of crank 25 becomes simply proportional to the speed deviation. In the opposite limit, removal of restriction 13 from passage 12 permits piston 14 to move freely in bore 10, thereby preventing the occurrence of a pressure gradient between passages 4 and 5. In this state, piston 17 is made nonresponsive to speed deviation and the displacement of crank 25 is made simply proportional to the time integral of the speed deviation. For the above reasons, variation of the flow resistance of restriction 13 provides a suitable method for variation of the transient response of the control system of this invention.

It can now be seen that the use of an orifice type flow restriction for restriction 8 will cause the loop-gain to be higher when the speed deviation is large than when the speed deviation is small. As the speed deviation approaches zero the loop-gain does not become zero because the flow through the orifice becomes laminar and the orifice produces the constant flow resistance characteristic. The use of an orifice type restriction for restriction 13 will cause the velocity of piston 14 to be proportional to the square root of the pressure gradient between passages 4 and 5 when the speed deviation is large and linearly proportional to said pressure gradient as the speed deviation approaches zero and the flow through orifice 13 becomes laminar. These effects can be used to compensate for gain variations and other non-linearities in the response of the prime mover to its throttle.

COMPENSATION FOR EXTERNAL TORQUE

If a steady torque is required to hold the prime-mover throttle in position, a torque must be applied, in steady state, to shaft 27 by crank 25. This torque requires the existance of a pressure gradient across pistons 14 and 17. For a pressure gradient to occur across pistons 14 and 17 in steady state, a pressure gradient must also exist across pump 1, for which occurrence, the equality of rate of displacement and rate of flow through restriction 6 must be disrupted. Therefore, a steady torque externally applied to shaft 27 causes a steady-state speed deviation. The magnitude of the steady-state speed deviation is proportional to the change in prime-mover speed that is required to generate the opposing pressure gradient. In steady state, piston 14 being at rest, the rate of change of the pressure gradient between passages 4 and 5 with speed deviation increases with the flow resistance of restrictions 6 and 8 only. If passage 7 is closed off, the rate of change of the pressure gradient is dependent on only restriction 6, made infinite.

The flow resistance between passage 5 and passage 28a, which as previously defined, is the change in pressure in passage 5 divided by the change of rate of flow from passage 5 to passage 28a that is caused by the change in pressure, can be made effectively infinite, over a range of pressure in passage 5, by the well known means illustrated in FIG. 2. In this configuration spring-biased valve 29 is responsive to the pressure upstream and downstream of restriction 6. Valve 29 restricts the flow to port 28a and, through the spring bias, automatically maintains the pressure gradient across restriction 6 at a substantially constant value. Because of the constant pressure gradient, the rate of flow through restriction 6 is made proportional to the effective area of restriction 6 or inversely proportional to the flow resistance, and independent of variations of pressure in passage 5 over a pressure range whereby the infinite flow-resistance characteristic is obtained. As is well known, the lower limit of the pressure range, in passage 5, over which valve 29 can maintain the contact pressure gradient is determined by the maximum port area to which valve 29 can open and the upper limit is dtermined by the minimum port area to which valve 29 can reduce.

An alternate and well known means through which the rate of flow through passage 5 into passage 28a can be automatically held constant, independent of pressure variations in passage 5, is illustrated in FIG. 3. It this configuration, unbiased valve 30 is responsive to the pressure upstream and downstream of positive displacement pump 31. Valve 30 restricts the flow into port 28a and automatically holds the pressure gradient across pump 31 at zero, thereby holding pump leakage and power at zero. In the configuration presented in FIG. 3 restriction 6 is is replaced by pump 31. Variation of the reference flow rate is obtained by the variation of the speed of pump 31. If pump 31 is driven at a constant speed, the steady-state speed of the prime mover being governed will be held at an equally constant value. The configuration presented in FIG. 3 is the preferred configuration when synchronization of the prime-mover speed with the speed of another prime mover is required. The limits of the pressure range in passage 5 over which valve 30 can maintain the zero pressure gradient is, as in the case of valve 29, limited by the maximum and the minimum port area to which valve 30 can automatically adjust.

The flow control configuration that is illustrated in FIGS. 2 and 3 can, as described, provide infinite flow resistance under a condition of flow, whereas the configuration of a fixed orifice such as represented by restriction 8 can provide infinite flow resistance only at zero flow rate. Because there is no requirement for steady flow through restriction 8, the reduction of its flow area to zero to obtain infinite resistance is functionally usefull in this system.

With the flow resistances of restriction 8 and of restriction 6 or pump 31 infinite, the steady-state speed deviation that is required to resist an externally applied torque on shaft 27 is theoretically zero. This theoretically perfect performance is degraded only by the finite leakage resistance of pump 1 and pistons 14 and 17, the finite power with which pump 1 can be driven and the pressure range in passage 5 over which valves 29 or 30 can maintain the aforementioned required pressure gradient.

The use of means holding the flow resistances of restriction 8 and restriction 6 or pump 31 infinite does not cause the rate of change of the pressure gradient between passage 4 and 5 with speed deviation to be infinite during transient operation and therefore, is not prohibited by a necessarily attended dynamic instability of the closed-loop system. During transient operation, the flow through restriction 13, accompanying the movement of piston 14, attenuates the rate of change of pressure gradient between passages 4 and 5 with speed deviation and thereby permits stable operation.

I find that when the flow resistance of restriction 8 and restriction 6 or pump 31 are infinite, that it is a necessary condition for dynamic stability that the area of piston 14 be greater than the area of piston 17. This requirement is readily met with the actuator configuration illustrated in FIG. 1.

LINEAR THROTTLE ACTUATION

When the prime-mover throttle is of such form that linear motion is required and it is not practicable to convert the rotary motion of shaft 27, in FIG. 1, to linear motion by external means, linear motion can be obtained directly from pistons 14 and 27.

In the configuration presented in FIG. 4, linear motion is obtained directly from the motions of pistons 14' and 17'. Members bearing the same reference numerals in FIG. 1 and FIG. 4 perform the same function. Referring to FIG. 4 rod 23' is coaxial with pistons 14' and 17', is fastened to piston 17' and extends in both directions, passing freely through bores in piston 14' and the walls of housing 2. The dual extension of rod 23' prevents a force unbalance from unequal piston areas.

In the configuration presented in FIG. 5 pistons 14' and 17' are housed in parallel but non-coaxial bores. Members bearing the same reference numerals in FIG. 1 and FIG. 5 perform the same function. Referring to FIG. 5, rod 23' is coaxial with and is fastened to piston 17 and extends in both directions, passing freely through bores in the walls of housing 2. Rod 23'a is coaxial with and is fastened to piston 14' and extends in both directions, passing freely through bores in housing 2. Rods 23' and 23'a are coupled to bar 32 by pin-and-slot joints 33 and 33a. Bar 32 is fastened to output rod 34 by pin joint 35. Rod 34 is constrained to move parallel to rods 23' and 23'a by bearing 2a. By the action of the linkages, the linear displacement of rod 34 is made the sum of displacements that are proportional to the displacements of pistons 14' and 17'.

There is a class of prime movers, typified by the variable-displacement hydraulic motor, in which it is advantageous to utilize the existing shafts of the motor displacement member in the throttle actuator assembly of this invention. Referring to FIG. 6, it will be seen that the foregoing relationship is achieved by dividing the piston and bore arrangement illustrated in FIG. 1 into two coaxial, axially spaced parts. Members bearing the same reference numerals in FIG. 1 and FIG. 6 perform the same function. In FIG. 6 the motor housing is referenced by the numeral 36 and the motor displacement member by the numeral 37. The pressure in chamber 38 of motor 36 is at all times much lower than the pressure in passages 4 and 5. By virtue of this pressure difference, the two parts of piston 14, referenced by the numerals 14' and 14'a, are urged toward each other against springs 19 and 18. Through the force bias, so established, springs 18 and 19 provide the necessary mechanical link between piston parts 14' and 14'a.

When the throttle for a hydraulic motor comprises a four-way valve of spool and sleeve construction, the pistons formed by the spool and the sleeve can be utilized as the throttle actuating pistons. The arrangement of spool and sleeve and the communicating passages through which the function of speed governing that comprise this invention are carried out in conjunction with a four-way valve is illustrated in FIG. 7. Members bearing the same reference numerals in FIG. 1 and FIG. 7 perform the same function. Referring to FIG. 7, the arrangement of pressure, return and motor annuluses that are shown are of typical four-way valve arrangement. Annulus 39 in valve body 40 communicates with an external pressure source. Annuluses 41 and 42 in valve body 40 communicate with a drain. Annuluses 43 and 44 in valve body 40 communicate through passages 45 and 46, respectively, with the hydraulic motor being governed. Annulus 48 in valve sleeve (and piston) 14' communicates with the pressure annulus 39. Annulus 49 of valve sleeve 14' communicates with return annulus 41 and annulus 50 of valve sleeve 14' communicates with the return annulus 42. Valve spool (and piston) 17' has lands 51, 52 and 53 which cover annuluses 49, 48 and 50 respectively. Chamber 54, formed between lands 51 and 52, communicates with passage 45. Chamber 55, formed between lands 52 and 53, communicates with passage 46.

In steady-state operation of the governor of this invention, valve spool 17' is spring centered in sleeve 14' as illustrated in FIG. 7 and valve sleeve 14' is axially displaced from the zero-flow position shown, to provide the flow rate required to drive motor 47 at the steady-state speed. During transient operation, the pressure gradient between passages 4 and 5 causes displacements of spool 17' and sleeve 14' which are in opposite axial directions. By this action, the flow area of the four-way valve is made proportional to the sum of the displacements of valve spool (or piston) 17' and valve sleeve (or piston) 14'. The speed of the hydraulic motor is, therefore, controlled by an action of the governor of this invention which is identical with that described in conjunction with FIG. 1.

BIDIRECTIONAL OPERATION

As previously described, the governor of this invention functions, under steady-state operation, in an identical manner for flow through pump 1 in either direction and responds in an identical manner to a positive or a negative speed deviation. For these reasons, the governor can be used to control a bidirectional prime mover, it being only necessary to provide a means for establishing the direction of flow through pump 1 in either direction.

FIG. 8 illustrates the manner in which a four-way valve is inserted between the pressure generator 3 and passages 4 and 5 to obtain bidirectional capability. Annulus 56 of four-way valve 57 communicates with the pressure port 28 of pressure generator 3 and annuluses 58 and 59 communicate with return port 28a of pressure generator 3. The two outlet chambers 60 and 61 of four-way valve 57 communicate with passages 4 and 5 respectively. Members bearing the same reference numerals in FIG. 1 and FIG. 8 perform the same function. When the flow is in the direction of the solid arrows, four-way valve 57 comprises orifice 62 formed between annulus 56 and land 63 and orifice 64 formed between annulus 58 and land 65. When the flow is in the direction of the dashed arrows, the four-way valve 57 comprises orifice 66 formed between annulus 56 and land 63 and orifice 67 formed between annulus 59 and land 68. With a symmetrical four-way valve, the flow resistances of the supply and return orifices are equal at all valve openings. During steady-state operation, the equality of flow resistance inserted in passages 4 and 5 by the symmetrical four-way valve 57 causes the static pressure in these passages to be one half the static pressure in discharge port 28, both pressures being referenced to the static pressure in return port 28a. During the period of a speed deviation, the pressures in passages 4 and 5 change equally and in opposite directions, yielding the same magnitude of pressure gradient across pump 1 as in the case of a single equivalent flow resistance at port 28a. For this reason, governor operation utilizing the configuration of FIG. 8 is identical with governor operation utilizing the configuration of FIG. 1.

The flow resistance of the four-way valve can be made effectively infinite by the means illustrated in FIG. 9. Through this means, the advantages of infinite flow resistance, previously described in conjunction with unidirectional operation, can be obtained with bidirectional operation. Referring to FIG. 9, spring biased valve 69 is interposed between annulus 58 of four-way valve 57 and return port 28a, and spring biased valve 69a is interposed between annulus 59 and return port 28a. Members bearing the same reference numerals in FIG. 9 and FIG. 8 perform the same function. Valve 69 communicates with annulus 58 through passage 70 and valve 69a communicates with annulus 59 through passage 70a. Valve 69 is responsive to the pressure in passage 5 and to the pressure in annulus 58. Valve 69a is responsive to the pressure in passage 4 and to the pressure in annulus 59. When the flow established through the four-way valve 57 is in the direction of the solid arrows in FIG. 9, spring-biased valve 69 restricts the flow from annulus 58 and through the spring bias automatically holds a fixed pressure gradient across orifice 64. Because of the constant pressure gradient across orifice 64, the flow rate through orifice 64 is made independent of the variations in pressure in passage 5. With the flow in the direction of the solid arrows, orifice 67 is closed off and valve 69a is driven closed by the pressure in passage 4. With the flow in the direction of the dashed arrows, spring-biased valve 69a restricts the flow from annulus 59 and through the spring bias automatically holds a fixed pressure gradient across orifice 67. Because of the constant pressure gradient across orifice 67, the rate of flow through orifice 67 is made independent of the variations in pressure in passage 4. With the flow in the direction of the dashed arrows, orifice 64 is closed off and valve 69 is driven closed by the pressure in passage 5.

Four-way valve 57, as schematically illustrated in FIGS. 8 and 9, utilizes a well known spool valve structure. In this structure, spool 57a is axially adjustable in bore 57b, bidirectional flow control being obtained through the selective opening of the orifices that are formed between the lands of the spool and the annuluses of the bore. Spool 57a is provided with a rod 57'a that projects out of the valve housing 57c through a suitable seal to provide a mechanical control means. The ends of bore 57b are suitably closed and vented. For mechanical control, the ends of bore 57b may be vented to a region of low pressure, such as return port 28a. When the spool 57a is not directly actuated by mechanical means, rod 57'a is omitted and the ends of bore 57b are vented to sources of actuating pressures that act on the spool ends. Any valve structure and actuating means that provides the same flow direction and orifice opening control as does the structure illustrated in FIGS. 8 and 9 can be employed in the hydraulic circuits described herein.

DUAL INTEGRATOR RESTRICTIONS

The flow resistance of restriction 13 of FIGS. 1, 4, 5, 6 and 7 controls the rate of displacement of piston 14 and thereby governs the rate of integration of the pressure gradient between passages 4 and 5. It may be noted that the passage symmetry presented in the configuration of FIG. 5 permits the function of restriction 13 to be performed with equal effectiveness with the location of restriction 13 being either in passage 5 or in passage 4, between the intersections with bore 16 and chamber 9 as illustrated by orifice 13a. Accordingly, the function of restriction 13 can be performed with a flow restriction in either or both of the locations, in the latter case the rate of integration being controlled by the sum of the flow resistances of the two restrictions. The passage symmetry in the configuration presented in FIG. 7 also permits the use of dual integrator restrictions. Dual integrator restrictions can also be employed with the coaxial piston configurations through a modification of the configurations presented in FIGS. 1, 4 and 6 in which, the direct communication of chamber 9 and bore 16 is eliminated and a second annulus is added to piston 14 to communicate with passage 4 and chamber 20. The system symmetry that is obtained through the use of dual integrator restrictions provides identical governor response in either direction of rotation as is normally required in bidirectional use.

I claim:

1. A mechanism for controlling the speed and the direction of a machine, said machine including a throttle for varying the speed and the direction of said machine, said mechanism comprising a first and a second flow restriction means and a positive displacement, bidirectional pump means conduited between said flow restriction means, said flow restriction means and said pump means defining a series array, selector means operative to communicate one side of said series array with a pressure source and the opposite side with a drain, or to communicate said opposite side with a pressure source and said one side with a drain, means driving said pump means at a speed proportional to the speed of said machine and in the corresponding direction, actuator means responsive to the pressure gradient across said pump means, and means coupling said actuator means to said throttle.

2. In claim 1, said actuator means comprising a first piston operating freely in a first bore and being longitudinally restrained in said first bore by a pair of opposing springs, a second piston operating freely in a second bore, first conduit pair communicating each end of said first bore with a side of said pump means, second conduit pair communicating each end of said second bore with a side of said pump means, third and fourth flow restriction means in said second conduit pair and linkage means coupled to said first and second pistons and to said throttle, said linkage means being operative to provide a displacement of said throttle that is proportional to the sum of the displacements of said pistons.

3. In the mechanism of claim 1, said first and said second flow restriction means and said selector means being elements of a four-way valve means, said valve means comprising a first pair of variable orifices and a first chamber therebetween, said first pair of orifices being alternately variable from zero open area to alternately communicate said first chamber with said pressure source or with said drain, said first chamber being in communication with a first side of said pump means, and a second pair of variable orifices and a second chamber therebetween, said second orifices being at zero open area while said first orifices are at zero open area and said second pair of orifices being alternately variable from zero open area to alternately communicate said second chamber with said pressure source while said first chamber is in communication with said drain, or with said drain while said first chamber is in communication with said pressure source, said second chamber being in communication with the second side of said pump means.

4. In the mechanism of claim 1, said first and said second flow restriction means and said selector means being elements of a four way valve, said four way valve comprising a first pair of variable orifices and a first chamber therebetween, said pair of variable orifices comprising a supply orifice and a return orifice and being alternately variable from zero open area to alternately communicate said first chamber with said pressure source or with said drain, said first chamber being in communication with a first side of said pump means, and a second pair of variable orifices and a seond chamber therebetween, said second pair of orifices comprising a second supply orifice and a second return orifice and being at zero open area while said first orifices are at zero open area and said second orifices being alternately variable from zero open area to alternately communicate said second chamber with said pressure source while said first chamber is in communication with said drain or with said drain while said first chamber is in communication with said pressure source, said second chamber being in communication with the second side of said pump means, and a first spring biased pressure responsive valve between said first return orifice and said drain, and a second spring biased pressure responsive valve between said second return orifice and said drain, said first valve restricting the flow from said first return orifice and being urged open by said spring bias and by the pressure downstream of said first return orifice and being urged closed by the pressure in said first chamber, said second valve restricting the flow from said second return orifice and being urged open by said spring bias and by the pressure downstream of said second return orifice and being urged closed by the pressure in said second chamber, said valves being thereby operable to hold a constant pressure gradient across said return orifices and whereby the rate of flow through said four way valve in either direction is made proportional to the orifice area of the open return orifice and independent of the pressure in said chambers.

5. In the mechanism of claim 2, said first and second bores enclosed in a housing and being held axially parallel, said linkage means comprising constant diameter piston rods coupled to and being coaxial with said pistons, said rods extending fore and aft of said pistons and passing through mating bores in said housing and extending externally, a third rod, said third rod being external to said housing and being axially restrained to slide parallel to and between said piston rods, and beam pivoted to said third rod, longitudinal end slots in said beam, a pin projecting radially from each piston rod, said pins mating with and engaging said slots, whereby the longitudinal displacement of said third rod is made the sum of displacements proportional to the displacements of said pistons, and means coupling said third rod to said throttle whereby the displacement of said throttle is made proportional to the displacement of said third rod.

6. In the mechanism of claim 2, said first piston being integral with a valve spool, said second piston being integral with a valve sleeve, said second bore being contained within a housing, said first bore being coaxial with and contained within said sleeve, annuluses in said second bore, openings in said sleeve, said openings and said annuluses defining separate fluid passages, second annuluses in said first bore, lands on said spool, said second annuluses and said lands defining variable orifices, means in said housing defining first and second chambers between the ends of said second bore and the ends of said sleeve, a third bore in said housing, said third bore being of equal diameter with and coaxial with said first bore and opening into said first chamber, a fourth bore in said housing, said fourth bore being of equal diameter with and coaxial with said first bore and opening into said second chamber, the end lands of said spool projecting out of said sleeve and extending through said first and second chambers and into said third and fourth bores, said spool operating freely in said third and fourth bores, said springs engaging the ends of said spool and restraining the longitudinal displacement of said spool relative to said housing, said spool and said sleeve being thereby responsive to said pressure gradient to make the displacement of said spool relative to said sleeve the sum of the displacements of said first and second pistons relative to said housing, and means utilizing said variable orifices to perform the function of said throttle.

7. A valve responsive to a first and a second pressure, said valve comprising a housing, a first bore in said housing, a valve sleeve operating in said first bore, openings in said sleeve, annuluses in said first bore, said openings and said annuluses defining separate fluid passages, a second bore, said second bore being coaxial with said first bore and contained within said sleeve, a valve spool operating freely in said second bore, lands on said spool, second annuluses in said second bore, said lands and said second annuluses defining variable orifices, means in said housing defining first and second chambers between the ends of said first bore and the ends of said sleeve, a third bore in said housing, said third bore being of equal diameter with and coaxial with said second bore and opening into said first chamber, a fourth bore in said housing, said fourth bore being of equal diameter with and coaxial with said second bore and opening into said second chamber, the end lands of said spool projecting out of said sleeve and extending through said first and second chambers and into said third and fourth bores, said spool operating freely in said third and fourth bores, springs engaging the ends of said spool and restraining the longitudinal displacement of said spool relative to said housing, a first conduit freely communicating said first pressure with said first chamber through a first flow restriction means, a second conduit freely communicating said first pressure with the end of said spool in said fourth bore, a third conduit freely communicating said second pressure with the end of said spool in said third bore, a fourth conduit communicating said second pressure with said second chamber through a second flow restriction means, said spool and said sleeve being thereby responsive to the difference between said first and second pressures to make the displacement of said spool relative to said sleeve proportional to the sum of a displacement proportional to said pressure difference and a displacement proportional to the time integral of said pressure difference.

8. An actuator responsive to a first and a second pressure comprising a first piston operating freely in a first bore, a second piston operating freely in a second bore, said second piston being longitudinally restrained by springs, said first piston being in communication with said first and said second pressures through flow restrictions, said second piston being in free communication with said first and said second pressures, and linkage means coupled to said pistons, said linkage means providing an output displacement that is the sum of displacements proportional to the displacement of said first and of said second piston, said actuator being thereby responsive to the difference between said first and second pressures to make the said output displacement proportional to the sum of a displacement proportional to said pressure difference and a displacement proportional to the time integral of said pressure difference.

* * * * *